United States Patent [19]
Audesse et al.

[11] 4,302,794
[45] Nov. 24, 1981

[54] LINEAR MULTILAMP PHOTOFLASH UNIT

[75] Inventors: Emery G. Audesse, Beverly, Mass.; Donald W. Hartman, Williamsport, Pa.

[73] Assignee: GTE Products Corporation, Stamford, Conn.

[21] Appl. No.: 72,251

[22] Filed: Sep. 4, 1979

[51] Int. Cl.³ .............................................. G03B 15/02
[52] U.S. Cl. ....................................... 362/15; 362/10; 362/240; 362/241
[58] Field of Search ..................... 362/15, 10, 240, 241

[56] References Cited
U.S. PATENT DOCUMENTS

4,155,110  5/1979  Armstrong et al. ............... 362/11 X

Primary Examiner—Stephen J. Lechert, Jr.
Attorney, Agent, or Firm—Edward J. Coleman

[57] ABSTRACT

A photoflash unit comprising a linear array of flashlamps mounted on a printed circuit strip disposed within the longitudinal channel of an elongated housing member. A light-transmitting cover panel is attached to the housing member for enclosing the flashlamps, and the circuit strip extends beyond the cover panel to expose connecting terminals. The lamps have tubular envelopes and are positioned with their longitudinal axes substantially parallel to the printed circuit strip and arranged in substantially coaxial alignment. The housing member includes ledges within the channel for spacing the printed circuit strip from the rear wall, and the sidewalls of the channel have guide ribs for engaging notches in the circuit strip for facilitating assembly and location and avoiding longitudinal shifting of the strip. The housing member further includes reflector cavities adjacent to the lamps, and a continuous coating of electrically conductive reflective material covers the surfaces of the channel and reflector cavities for providing both reflective surfaces for flashing lamps and a shield to reduce the likelihood of accidental flashing of lamps by electrostatic charges. In a preferred embodiment, the unit has connector terminals at opposite ends, and the linear array of flashlamps is divided into two groups disposed in opposite halves of the unit, each group of lamps being operated by the connector terminals at the remote end so as to reduce the red-eye photographic effect.

34 Claims, 9 Drawing Figures

LINEAR MULTILAMP PHOTOFLASH UNIT

BACKGROUND OF THE INVENTION

This invention relates to multilamp photoflash units and, more particularly, to an improved linear array of photoflash lamps.

Numerous multilamp arrangements with various types of sequencing circuits have been described in the prior art; particularly, in the past few years. A currently marketed photoflash unit (described in U.S. Pat. Nos. 3,894,226; 3,912,442; 3,935,442; 3,937,946; 3,941,992; 3,952,320 and 4,017,728 and referred to as flip flash) employs high voltage type lamps adapted to be ignited sequentially by successively applied high voltage firing pulses from a source such as a camera-shutter-actuated piezoelectric element. The flip flash unit comprises an elongated planar array of eight high-voltage type flashlamps mounted on a printed circuit board with an array of respectively associated reflectors disposed therebetween. The lamps are arranged in two groups of four disposed on the upper and lower half respectively of the rectangular-shaped circuit board. A set of terminal contacts at the lower end of the unit is provided for activation of the upper group of lamps, while a set of terminal contacts at the top of the unit is operatively associated with the lower group of lamps. The application of successive high-voltage pulses (e.g. 500 to 4,000 from, say, a piezoelectric source controlled by the shutter of a camera in which the array is inserted) to the terminal contacts at the lower end of the unit causes the four lamps at the upper half of the array to be sequentially ignited. The array may then be turned end for end and again inserted into the camera in order to flash the remaining four lamps. In this manner, one group of lamps (or half of the array) functions as a flash extender for the other group of lamps, so that only the group of lamps relatively farther from the camera lens axis can be flashed. The purpose of such an arrangement is to position the "active" group of flashlamps farther above the camera lens in order to reduce the possibility of a "red-eye" effect that causes the pupils of a person's eyes to appear red or pink in the flash pictures taken when the flashlamp is close to a camera lens.

The flip flash circuit board comprises an insulaing sheet of plastic having a pattern of conductive circuit traces, including the terminal contacts, on one side. The flashlamp leads are electrically connected to the circuit traces by means of eyelets secured in the circuit board and crimped to the lead-in wires. The circuitry on the board includes six printed, normally open, connect switches that chemically change from high to lower resistance so as to become electrically conducting after exposure to the radiant heat energy from an ignited flashlamp operatively associated therewith. The purpose of these switches is to provide lamp sequencing and one-at-a-time flashing. The four lamps of each group are arranged in a parallel circuit with three of the four lamps being connected in series with respective thermal connect switches. Initially, only the first of the group of four lamps is connected directly to the voltage pulse source. When this first group flashes, it causes its associated thermal connect switch (which is series connected with the next or second lamp) to become permanently conductive. Because of this action, the second lamp of the group of four is connected to the pulse source. This sequence of events is repeated until all four lamps have been flashed.

The overall construction of the flip flash unit comprises front and back plastic housing members with interlocking means for providing a unitary structure. The front housing member is a rectangular concavity, and the back housing is substantially flat. Sandwiched between the front and back housing members, in the order named, are the flashlamps, a unitary member, preferably of aluminum-coated plastic, shaped to provide the eight individual reflectors of the array, an insulating sheet, a printed circuit board, and an indicia sheet, which is provided with information trademarks and flash indicators located behind the respective lamps and which change color due to heat and/or light radiation from a flashing lamp, thus indicating at a glance which of the lamps have been flashed and not flashed. Each of the individual reflectors have a concave, generally parabolic, surface with the lamps being disposed within this concavity; the rear surface of the reflector has holes or slots to permit light and heat radiation to pass through for actuating circuit board switches and flash indicators. In order to provide electrostatic shielding for the lamps and circuitry, the reflector member is rendered electrically conductive by a reflective metalized coating thereon, and this coating is electrically connected to a common circuit conductor on the printed circuit board. Further, a metal foil is laminated on the indicia sheet and also connected to this common conductor of the circuit board.

In U.S. Pat. No. 4,133,023, a flip flash array is illustrated which does not employ aluminizing on the reflector member and, thus, eliminates the insulating sheet between the reflector member and the printed circuit board. The flashlamps, which have long tubular envelopes, are arranged to lie horizontally and are stacked vertically as contrasted to the earlier flip flash unit which employed vertically oriented lamps arranged in two columns of four each. The overall dimensions of both types of arrays are approximately the same. In view of the modified reflector, however, the foil-laminated indicia sheet is provided with folded side portions which extend from the back to the front along each side of the unit so as to provide additional electrostatic shielding.

U.S. Pat. No. 4,164,007 describes an improved multilamp photoflash unit which more efficiently utilizes a given housing volume and thereby reduces the cost of the unit per flash lamp contained therein. More specifically, a compact lamp arrangement is provided whereby additional lamps are contained in a given volume while maintaining light output performance requirements. In a particular embodiment described, ten lamps are provided in a housing having the same dimensions as the above-discussed eight-lamp flip flash units. This greater compactness is provided by arranging the planar array of lamps in two parallel columns with the tubular envelopes horizontally disposed and with the lamps of one column staggered with respect to the other such that the bases are interdigitated. A pair of reflector panels are aligned with the two columns of lamps and arranged to overlie the lamp lead-in wires and bases.

Another U.S. Patent, namely, U.S. Pat. No. 4,136,377, describes a foldable photoflash unit for avoiding the "red-eye" effect. In this instance, a linear array of lamps is provided in an elongated housing which pivots at one end, in jackknife fashion, from a mounting or support member inserted in a camera socket. The housing of this unit is illustrated as comprising a base, a light-transmitting cover, a printed circuit board, and a reflector member having a plurality of cavities in which the lamps are mounted. The lamps have tubular envelopes and are arranged with the longitudinal axis of the lamps normal to the longitudinal axis of the elongated housing. When the housing is pivoted outwardly for operation, the linear array of lamps are disposed in a horizontal row with each of the lamp envelopes oriented vertically.

Although each of the above-described photoflash devices provide satisfactory operation and useful means for overcoming the red-eye problem, the construction of all of the units is somewhat cumbersome and costly in terms of both materials and manufacturing assembly.

Other somewhat more compact photoflash array packages are described in U.S. Pat. Nos. 3,430,545 and 3,473,880 of Wick and Austrian Pat. No. 267323; however, none of these photoflash arrays appear suited for high-voltage type lamp operation due to lack of electrostatic shielding of the lamps and the circuitry, and none of the approaches contend with the red-eye problem. Both of the Wick patents show horizontal arrays of lamps in which the rear housing member also appears to integrally provide reflector cavities for each lamp and a circuit board substrate. A light-transmitting cover is attached to the front of the rear housing member. In U.S. Pat. No. 3,430,545, the switching appears to be accomplished in the camera, whereas in U.S. Pat. No. 3,473,880, the switching means is provided in each lamp, a feature which would appear to increase the cost and complexity of the photoflash lamps. The last mentioned Wick patent also illustrates an embodiment wherein horizontally oriented lamps are disposed in two vertical columns. The Austrian patent discloses two embodiments of a vertical linear array having a connector at one end. None of the units employs a printed circuit board. In one of the embodiments, each lamp is oriented diagonally and inserted in the socket of a supporting wall which provides reflectors for each lamp. The supporting wall-reflector-lamp assembly is enclosed in a tubular transparent container closed off at the top by a hemispherical cap and seated on a plastic base having a connector. In a second embodiment, the lamps of the array are oriented vertically along a common axis and mounted on a ladder-type support member within the tubular transparent cover. A portion of one wall of the tubular transparent cover may be coated with a reflecting layer.

The still-camera photography market is now about equally divided between conventional and instant picture type cameras. Significant advances in the speed of both the film and lenses for conventional cameras have reduced the light levels needed from a mating photoflash device. In contrast, many now popular instant picture cameras are preferably used with even brighter flash sources than flip flash. In order to meaningfully increase the photographically useful light from a conventional flip flash, for use with instant picture cameras, the number of lamps would have to be held at eight, or preferably even reduced to six (to permit, large efficient reflectors). The necessary prorating of the array component costs gives an unfavorable per flash cost with such six or eight lamp output enhanced flip flash arrays. Increasing the number of lamps to more than ten per array (as, for example, in a decreased output product for use with present high-speed films in conventional cameras) gives rise to high unit cost, crowding of the high voltage circuit board, and the problem of an unacceptable number of inaccessible good lamps if one earlier-firing lamp should fail.

SUMMARY OF THE INVENTION

Accordingly, it is an object of the present invention to provide an improved multilamp photoflash unit having a simplified, more cost-efficient construction which is significantly more compact.

A further object is to provide a multilamp array having a significantly lower cost per unit and permitting greater versatility in matching the light output requirements of the various camera systems now on the market.

Yet another object is to provide a low cost, compact multilamp photoflash unit which reduces the red-eye effect and is suitable for high-voltage type flashlamps.

These and other objects, advantages, and features are attained in a photoflash unit comprising a plurality of electrically ignitable flashlamps disposed in a linear array along a printed circuit board in the form of an elongated strip having lamp-firing circuitry thereon to which the lamp lead-in wires are connected. The printed circuit strip is located within the longitudinal channel of an elongated housing member having reflective surfaces adjacent the lamps. A light-transmitting cover panel is attached to the front of housing member to enclose the flashlamps therein.

The flashlamps have substantially tubular envelopes and are positioned with the longitudinal axes thereof substantially parallel to a surface of the printed circuit strip and arranged in substantially coaxial alignment. The end of the circuit strip extends beyond the cover panel to expose terminals thereon for connection to a camera. Typically, the diameter of the lamps, the width of the printed circuit strip and the width of the channel in the housing member are nearly equal.

According to a preferred embodiment, the channel in the housing member has a substantially semi-rectangular cross-section, and outer flanges adjoin opposite side walls of this semi-rectangular channel. A plurality of symmetrical segments of parabolic reflector cavities are formed in these outer flanges, with each pair of the parabolic reflector cavity segments being disposed on opposite sides of a respective one of the flashlamps. Surfaces of the channel and the reflector cavities are covered with a continuous coating of electrically conductive reflective material, such as by being aluminized. This conductive coating is then connected to a common circuit conductor carried on the printed circuit strip. In this manner the conductively coated housing member integrally provides a multi-cavity reflector for the flashlamps and an electrostatic sheild to avoid accidental firing of the lamps.

The housing member is also provided with means, such as transverse ribs or longitudinally extending ledges, for spacing the printed circuit strip from the rear wall of the channel. Further, guide ribs are formed on opposite side walls of the channel normal to the rear wall thereof for engaging notches in opposite edges of the printed circuit strip about the mid portion thereof. These guide ribs facilitate assembly and location of the strip within the housing member and prevent longitudinal shifting thereof. In one embodiment, the notches and guide ribs are longitudinally offset to prevent mounting of the printed circuit strip within the channel with the obverse side of the strip reversed to face the rear wall of the channel. Preferably, the side wall guide ribs are tapered to faclitate fitting into the printed circuit strip notches during assembly.

In a preferred embodiment for avoiding the red-eye effect, the linear array of flashlamps is divided into first and second groups of two or more lamps each disposed on respectively opposite halves of the printed circuit strip. The circuit strip includes first and second connector means at respectively opposite ends thereof, with the first connector being located on the half of the circuit strip containing the first group of lamps and being separated thereby from the second group of lamps, and with the second connector being located on the half of the circuit strip containing the second group of lamps and being separated thereby from the first group of lamps. A portion of the circuitry couples the first connector to each lamp of the second group and another portion of the circuitry couples the second connector to each lamp of the first group. Thus, application of voltage pulses to the terminal contacts at the lower end of the unit causes the lamps at the upper half of the array to be sequentially ignited. The array may then be turned end for end and again inserted into the camera in order to flash the remaining lamps. In this manner, one group of lamps (or half of the array) functions as a flash extender for the other group of lamps, so that only the group of lamps relatively farther from the camera lens axis can be flashed.

The linear photoflash array according to the present invention attains significant economy of manufacture through the use of a single, integral component as both the reflector and the rear housing of the product, thereby eliminating a separate base or rear housing member. Further economy of manufacture is realized by the use of essentially full metalization of the reflector-housing member as the electrostatic shield for the circuit board and lamps carried internally thereof, thereby eliminating the need for separate cost-increasing shields. These and other aspects contributing to integrality of construction, product simplicity and economy of manufacture, result in a more cost-effective and pocketable unit and facilitate the practical marketing of separate arrays custom-tailored to the now-divergent needs of conventional and instant picture systems. For example, using the same basic construction, the unit can be dimensioned to provide a double-ended array having three comparatively lower output flashlamps in each half of the unit (a total of six lamps) for use with conventional cameras employing higher speed film or the unit can be configured to provide a double-ended array of two higher output lamps associated with larger reflectors in each half of the array (a total of four lamps) for use with instant picture cameras. In each case, the overall length of the unit would be approximately the same or slightly larger than the flip flash units mentioned hereinbefore.

BRIEF DESCRIPTION OF THE DRAWINGS

This invention will be more fully described hereinafter in conjunction with the accompanying drawings, in which.

DESCRIPTION OF PREFERRED EMBODIMENTS

Figure 1:
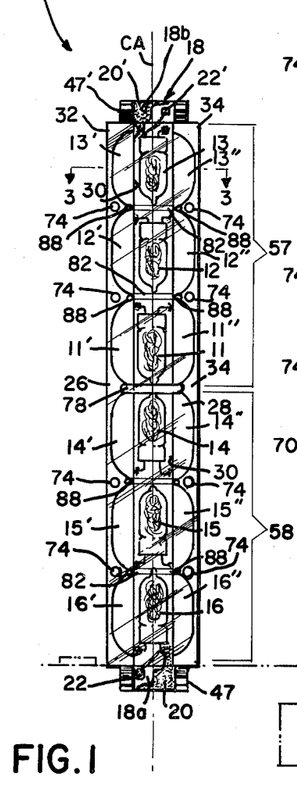
FIG. 1 is a front elevation of a multilamp photoflash unit in accordance with the invention, with the camera on which it is mounted shown in phantom.
Figure 2:
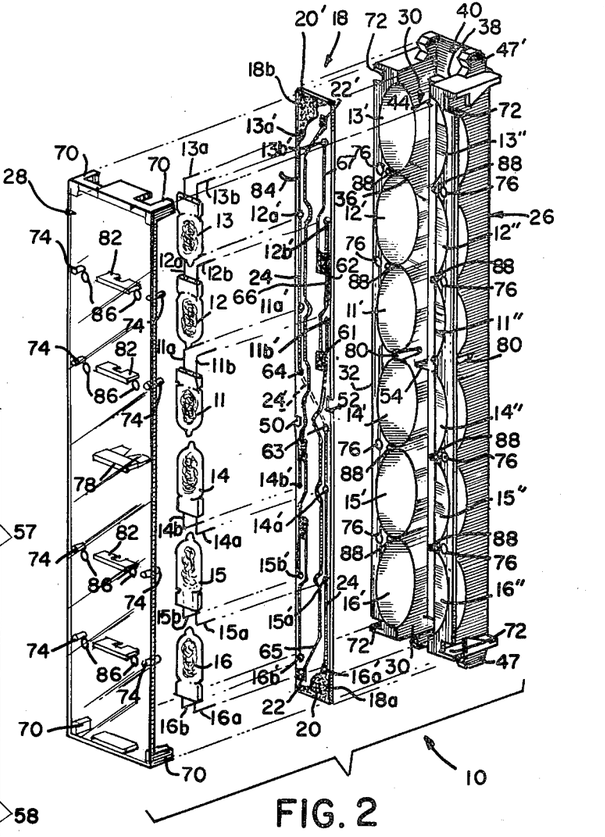
FIG. 2 is an exploded perspective view of the photoflash unit of FIG. 1.

FIGS. 1 and 2 illustrate a multilamp photoflash unit 10 comprising a linear array of six flash lamps 11–13 and 14–16 mounted on a printed circuit board 18 in the form of an elongated strip. Each of the lamps has a pair of lead-in wires 11a, 11b, etc. connected to the printed circuitry on strip 18. For example, the lead-in wires 11a, 11b, etc., may be soldered to respective connector pads 11a', 11b', etc., forming portions of the conductive circuit runs on strip 18. Each of the lamps 11, etc. has a tubular light-transmitting glass envelope having a press-seal at one end through which the lead-in wires emerge, and a tip-off at the other end. The exterior of the envelope is coated with cellulose acetate lacquer and the interior is filled with a quantity of filamentary combustible material, such as shredded zirconium, and a combustion supporting gas, such as oxygen. The ignition means within the lamp envelope may comprise, in the case of a low voltage source, a filament connected across the inner ends of the lead-in wires with beads of primer material disposed about the junctions of the lead-in wires and filament. In the case of a high voltage power source, for which the illustrated embodiment is particularly intended, the ignition structure may comprise a primer bridge or a spark gap type construction. For example, a particularly suitable high-voltage type flashlamp suitable for use in the linear array according to the present invention is described in U.S. Pat. No. 4,059,389, wherein the ignition structure comprises a pair of spaced apart lead-in wires with spherically shaped terminations, a glass frit coating over the lead-in wires, and a coating of primer material over the frit-coated terminations. The primer may bridge the wire terminations, with the filamentary combustible being in contact with both terminations to provide a conducting path therebetween.

When the flashlamps are mounted and positioned on circuit strip 18, the lead-in wires 11a, 11b, etc., are bent at a right angle, as illustrated, so that all of the tubular envelopes of the lamps are positioned with the longitudinal axes thereof substantially parallel to the surface of printed circuit strip 18 and arranged in substantially coaxial alignment along a common longitudinal axis CA. Further, as described in copending application Ser. No. 072526 filed concurrently herewith and assigned to the present assignee, the three lamps 11–13 at the top half of the array are inverted with respect to the three lamps 14–16 at the bottom half of the array.

Referring to FIG. 2, the circuit strip 18 has a "printed circuit" thereon for causing sequential flashing of the lamps by applied firing voltage pulses. In this particular embodiment, essentially the entire printed circuit is provided on one surface of the strip 18, namely, the obverse side of the strip over which the flashlamps are positioned. The substrate of strip 18 comprises an insulating material, such as polystyrene, and the pattern conductor runs may be provided on the surface thereof by means such as silk screening, chemical etching, etc. Each end of the circuit strip 18 functions as a connector tab, denoted as 18a and 18b respectively. The tab 18a is provided with a pair of electrical terminals 20 and 22, and similarly the tab 18b is provided with a pair of terminals 20' and 22', for contacting terminals of a camera socket for applying firing voltage pulses to the array. As will be described in more detail hereinafter, the terminals 20 and 20' form part of and are connected to a common circuit conductor run 24 which is connected electrically to one lead-in wire of each of the flashlamps. As a result, terminals 20 and 20' function as part of a "ground" circuit and are shown as having an enlarged configuration for reducing the likelihood of lamps being accidentally flashed by electrostatic voltage when the array is handled.

Figure 3:
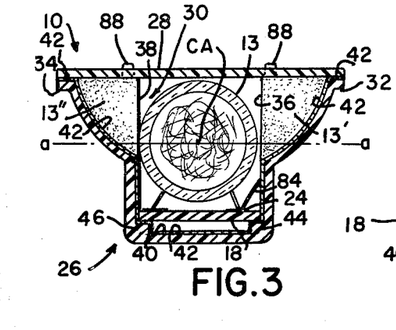
FIG. 3 is an enlarged cross-sectional view taken along 3—3 of FIG. 1.

The circuit strip-lamp assembly, which forms the functional core of the unit 10, is enclosed in a comparatively simple and compact housing construction of a cost-efficient and versatile design. More specifically, the unit enclosure comprises just two components, namely, a rear housing member 26 and a light-transmitting cover panel 28. Referring also to FIG. 3, housing member 26 has an elongated configuration and includes a longitudinal channel 30 which has a cross-section which is substantially semi-rectangular. The circuit strip-lamp assembly is located within channel 30, and cover panel 28 is attached to the front of the housing 26 so as to enclose the lamps. As illustrated in FIG. 1, the ends, or tabs, 18a and 18b of the circuit strip extend beyond the opposite ends of the elongated cover panel 28 to expose the terminals 20, 22 and 20', 22', thereon for connection to a camera.

The rear housing member 26 further includes outer flanges 32 and 34 which adjoin the opposite side walls 36 and 38, respectively, of the semi-rectangular channel. Formed in these outer flanges are a plurality of symmetrical segments of parabolic reflector cavities, with each pair of reflector cavity segments 11', 11'', etc. on opposite sides of the channel 30 being associated with a respective one of the flashlamps 11, etc. Housing member 26 is molded of an insulating plastic material, such as polystyrene, but reflective surfaces are provided adjacent to all the flashlamps by covering all of the surfaces of channel 30 (i.e., side walls 36 and 38 and rear wall 40) and the surfaces of the outer flanges 32 and 34 which face the cover panel, including the parabolic reflector cavity segments 11', 11'', etc., with a continuous coating of conductive reflective material 42. For example, the channel and front surfaces of the flanges may be metalized, such as by an aluminum vacuum deposition process. In this manner, member 26 integrally functions as a compact, cost-efficient, multi-cavity reflector member in addition to functioning as a rear housing enclosure. It will be noted that the lamp-carrying terminal strip is located substantially internal to this reflector member. Further, referring particularly to FIGS. 1 and 3, it will also be noted that the common longitudinal axis CA of the linear array of flashlamps 11, etc., is substantially parallel to the longitudinal axes of printed circuit strip 18 and channel 30 and lies in a plane a—a which symmetrically intersects the parabolic reflector cavity segments 11', 11'', etc. on opposite sides of the channel.

Hence, portions of the reflector cavities and sidewall reflective surfaces are located behind the longitudinal center line of the lamps so that as each lamp is flashed, light is projected forwardly of the array.

In various embodiments of the unit, conductive circuit traces may be located on the side of the strip 18 facing the channel rear wall 40 and/or the lamp lead-in wires may extend through the board to the reverse side. Accordingly, it is desirable, from the standpoint of both providing physical clearance and avoiding electrical short circuiting, to provide means for spacing the printed circuit strip 18 from the rear wall 40 of the channel. In the embodiment illustrated from various aspects in FIGS. 2-7, this spacing means is provided by a set of longitudinally extending ledges 44 and 46 which are integrally formed along the corners of the channel 30 adjacent to the rear wall 40 of the molded one piece housing member 26. As illustrated, for example in FIG. 3, the continuous coating of electrically conductive material 42 can be applied to also cover the surfaces of the ledges 44 and 46.

The housing member further includes integral extensions 47 and 47' at the opposite ends thereof which partly surround and protect the extending connector tabs 18a and 18b of the printed circuit strip 18, exposing the terminals thereon, and also function to facilitate mechanical attachment to the camera socket. As shown for one end of the housing member in FIG. 6, each of the integral extensions 47 and 47' is offset (at 47a' in FIG. 6) from the rear wall 40 of the channel 30 so as to support the end of the printed circuit strip 18 in the same plane that the strip is supported by the ledges 44 and 46.

Figure 8:
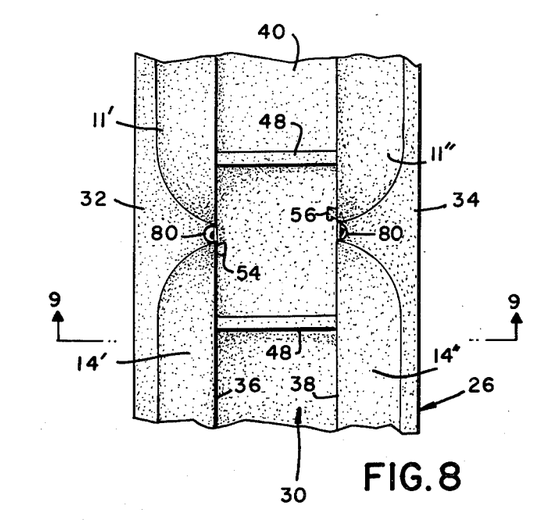
FIG. 8 is a front fragmentary view of the midportion of a alternative embodiment of the rear housing member.
Figure 9:
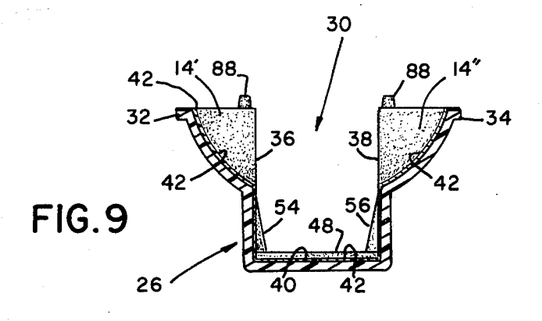
FIG. 9 is a cross-sectional view taken along 9—9 of FIG. 8.

In lieu of employing longitudinal ledges for spacing the printed circuit strip from the rear wall of the housing channel, an alternative embodiment is illustrated in FIGS. 8 and 9 wherein spacing is provided by a plurality of transverse ribs 48 formed on the rear wall 40 of the housing channel 30 and spaced along the length thereof.

Figure 4:
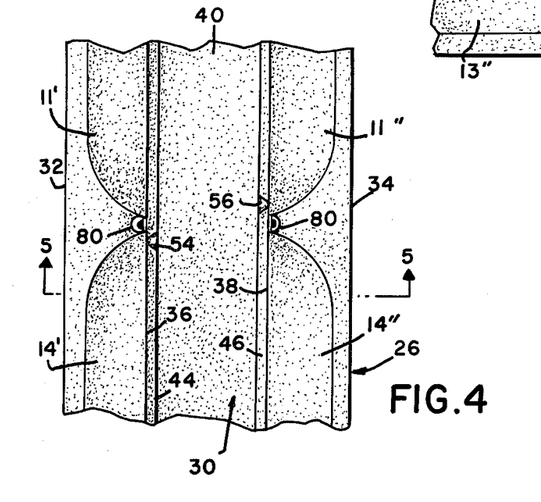
FIG. 4 is a front fragmentary view of the midportion of the rear housing member.
Figure 5:
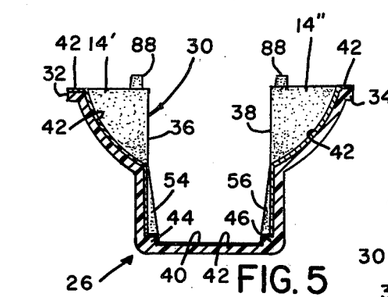
FIG. 5 is a cross-sectional view taken along 5—5 of FIG. 4.
Figure 6:
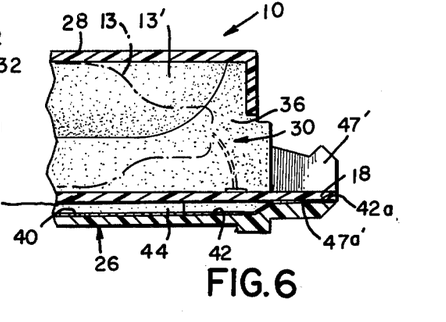
FIG. 6 is a fragmentary longitudinal section of an end portion of the unit of FIGS. 1 and 2, with the lamp shown in phantom.
Figure 7:
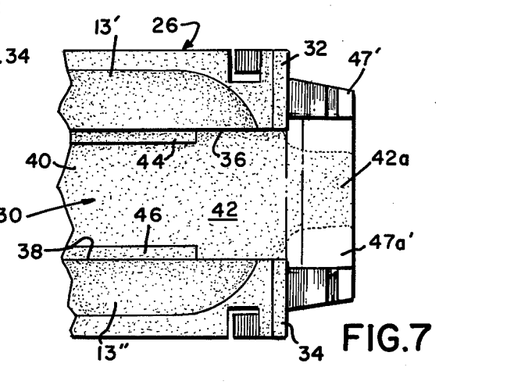
FIG. 7 is a front fragmentary view of an end portion of the rear housing member.

In order to facilitate assembly and location of the printed circuit strip within channel 30 so as to center the strip from end to end within the housing member, the printed circuit strip 18 is provided with notches 50 and 52 in the opposite edges about the midportion thereof (FIG. 2), and as shown in FIGS. 2, 4, and 5, the housing member molding is provided with guide ribs 54 and 56 which are formed on the opposite side walls 36 and 38 of the channel 30 normal to the rear wall 40 thereof. As the circuit strip 18 is placed in the channel 30, the guide ribs 54 and 56 engage the notches 50 and 52, respectively, to facilitate the joining and centering of the two parts and, once assembled, the rib-notch engagement prevents longitudinal shifting of the strip 18 within the housing channel. That is, the position of the connector tabs 18a and 18b is consistently maintained with respect to the housing member extensions 47 and 47' to assure a reliable connection means.

In order to better facilitate fitting of the side wall guide ribs into the printed circuit board during mechanized assembly, the guide ribs 54 and 56 are tapered, as illustrated, to avoid an interference fit between the ribs and notches. Further, as shown in FIG. 2, the notches 50 and 52 of the printed circuit strip are longitudinally offset from one another in a manner corresponding to the circuit strip notches. This offsetting of the ribs and notches prevents mounting of the printed circuit strip within the channel with the obverse side of the side reversed to face the rear wall 40. Thus, for example, if during production assembly the strips are mounted prior to lamp attachment or lamps are inadvertently attached to the wrong side of the strip, the rib-notch offset prevents accidental mounting of the printed circuit strip with the connector terminals 20, 22, and 20', 22' facing the rear wall of the housing extensions, rather than being exposed for reliable electrical connection.

The light-transmitting cover panel 28 basically comprises a planar strip of clear plastic material, such as polystyrene, and may be attached to the plastic rear housing member 26 by conventional methods, such as the use of cement or ultrasonic welding about the periphery. Improved structural rigidity and cost-efficienty, however, are provided by a preferred method of attachment described in copending application Ser. No. 072529, filed concurrently herewith and assigned to the present assignee. Referring to FIGS. 1 and 2, the cover panel molding includes four rectangular corner posts 70 which fit into corresponding slots 72 in the housing member flanges and straddle respective ends thereof. These corner posts grip the sides of housing member 26 on the outside and are ultrasonically welded thereto. This secures the ends of the panel and prevents spreading of the respective ends of the housing. Along each side of the midportion of the cover are provided four cylindrical posts 74 (a total of eight) which fit into corresponding holes 76 in the rear housing. Ultrasonically heated and pressure-formed rivet heads (not shown) are formed on the ends of these posts to secure the longitudinal edges of the cover to the housing. Further, cover panel 28 includes a transverse web 78 which projects from the center thereof and fits within slots 80 in the side walls 36 and 38 of the housing channel 30. Web 78 thereby bridges the housing channel to provide oppositely directed forces with respect to the four corner posts 70 so as to prevent collapse of the central portion of the cover panel and assure a snug fit. Ultrasonic welding is also employed on each side of the web 78 which engages a slot 80.

As described in copending application Ser. No. 072534, filed concurrently herewith and assigned to the present assignee, the integral transverse web 78 of cover 28 also provides a light-attenuating partition between the tips of lamps 11 and 14 to prevent sympathetic flashing. Additional transverse webs 82 of reduced size are also provided as integral parts of cover 28 to prevent sympathetic flashing between the remainder of the lamps.

When fully assembled, the completed photoflash unit according to the invention is provided with a plug-in connector tab 18a at the lower end thereof which is adapted to fit into a camera or flash adapter. A second plug-in connector tab 18b is provided at the top end of the unit whereby the array is adapted to be attached to the camera socket in either of two orientations, i.e. with either the tab 18a or 18b plugged into the socket. The lamps are arranged in two groups of three disposed on the upper and lower halves, respectively, of the elongated linear array. Upper group 57 comprises lamps 11–13, and lower group 58 includes lamps 14–16; the reflector cavity segments 11', 11", etc., along with the reflective channel side walls, are associated with the respective lamps so that as each lamp is flashed, light is projected forwardly of the array. The lamps are arranged and connected so that when the array is connected to a camera by the connector tab 18a (such as illustrated in FIG. 1 for the case of camera 60 shown in phantom) only the upper group 57 of the lamps will be flashed, and when the array is turned end for end and connected to the camera by the other connector tab 18b, only the then upper group 58 of lamps will be flashed. By this arrangement, only lamps relatively far from the camera lens axis are flashable, thus reducing the undesirable red-eye effect.

Referring to FIG. 2, the circuit board 18 has a "printed circuit" thereon for causing sequential flashing of the lamps by firing voltage pulses applied to the terminals 20, 22, 20' 22'. The top and bottom of the printed circuitry preferably are reverse mirror images of each other. The circuit located on the upper half of the circuit strip 18 and activated by the pair of terminals 20 and 22 includes three lamps 11-13 arranged in parallel across the input terminals. The circuit also includes two normally open (N/O) radiant-energy-activated connect switches 61 and 62 for providing sequential flashing of the lamps 11-13 in response to firing pulses successively applied to the input terminals 20 and 22. Each N/O connect switch is responsive to the flashing of an associated lamp to form a closed circuit condition. One terminal (lead-in wire) of each of the lamps 11-13 is connected in common by means of an electrical "ground" circuit run 24 to input terminal 20. The "ground" circuit run 24 includes the terminals 20 and 20' and makes contact with one of the lead-in wires for each of the lamps 11-16. This "ground" circuit crossover is accomplished at the midportion of the circuit strip, without interferring with the "hot", or signal, conductor runs, by terminating the common conductor runs 24 on each half of the strip at through-connection points 63 and 64, such as eyelets passing through the strip 18, and interconnecting these points on the reverse side of the strip by a common conductor segment, indicated as 24'.

The first lamp to be fired, namely, lamp 11, is connected directly across the input terminals 20 and 22. The N/O connect switches 61 and 62 are series connected in that order with lamp 13, which is the third and last lamp to be fired, across the input terminals 20 and 22. The second lamp to be fired (lamp 12) is series connected with the N/O switch 61.

Terminal 22 is part of a "hot", or signal, circuit conductor run 65 that terminates at a lead-in wire of lamp 11 and one terminal of the N/O switch 61. The other side of switch 61 is connected to a lead-in wire of lamp 12 and one terminal of N/O switch 62 via a circuit run 66. Circuit run 67 then connects the other terminal or switch 62 to a lead-in wire of lamp 13.

The radiant-energy-activated N/O connect switches 61 and 62 are in contact with and bridge across the circuit runs that are connected to them. The material for the connect switch is selected to be of the type initially having an open circuit or high resistance, the resistance thereof becoming literally zero or a low value when the material receives radiation in the form of heat and/or light from a respective adjacent lamp, upon the lamp being flashed. For this purpose, each of the connect switches is respectively positioned behind and near to an associated flashlamp. More specifically, switch 61 is positioned behind lamp 11, and switch 62 is positioned behind lamp 12.

The high resistance past used to make switches 61 and 62 may comprise a known mixture of silver compound and a binder. According to a preferred embodiment, however, the material comprises a silver compound such as silver carbonate, a binder such as polystyrene resin, a large proportion of electrically non-conductive inert particulate solids, such as titanium dioxide, and a protective oxidizing agent such as barium chromate. For example, as described in a copending application Ser. No. 021,398, filed Mar. 19, 1979, and assigned to the present assignee, the dried composition of a specific silk-screenable high resistance material comprises 67.43% silver carbonate, 22.48% titanium dioxide, 8.99% glass beads, 0.11% barium chromate, 0.07% lecithin as a wetting agent, and 0.91% polystyrene resin as a binder. The barium chromate was included to enhance environmental stability, as described in U.S. Pat. No. 4,087,233. This mixture is made into a paste by ball milling in a suitable solvent such as butyl cellosolve acetate. The solids content may be adjusted to suit the method of switch application. For silk screening over a circuit strip, it is preferred to adjust the solids content to about 74%.

The circuit on the circuit strip 18 functions as follows. Assuming that none of the three lamps on the upper half of the unit have been flashed, upon occurrence of the first firing pulse applied across the terminals 20 and 22, this pulse will be directly applied to the lead-in wires of the first-connected flashlamp 11, whereupon lamp 11 flashes and becomes an open circuit between its lead-in wires. Heat and/or light radiation from the flashing first lamp 11 is operative to activate the N/O connect switch 61. As a result, the radiation causes the normally open connect switch 61 to become a closed circuit (or a low value of resistance), thereby connecting the circuit strip terminal 22 electrically to the second lamp 12 via circuit run 66. By the time this occurs, the firing pulse has diminished to a value insufficient to cause the second lamp to flash. When the next firing pulse occurs, it is applied to the lead-in wires of the second lamp 12 via the row closed connect switch 61, whereupon the second lamp 12 flashes and becomes an open circuit between its lead-in wires, with the lamp radiation causing the connect switch 62 to assume a near zero or low resistance. When the next firing pulse occurs, it is applied via the now closed connect switches 61 and 62 to the lead-in wires of the third flashlamp 13, thereupon causing the lamp to flash. Since this lamp is the last lamp in the active circuit, it does not matter whether its lead-in wires are an open or closed circuit after flashing. When the flash unit is turned around and the other connector tab 18b attached to the camera socket, the group 58 of lamps that then becomes upper most and farthest away from the camera lens will be in the active circuit and will be flashed in the same manner as has been described. In a preferred embodiment, the lamps 11, etc., are high voltage types requiring about 2,000 volts, for example, at low current for flashing, and they can be fired by impacting or stressing a piezoelectric element in the camera.

The primers used in the high-voltage type flashlamps employed in the above-described embodiment of the invention are designed to be highly sensitive to high voltage breakdown. Electrical energies as low as a few microjoules are sufficient to promote ignition of such primers and flashing of the lamps. The high sensitivity is needed in order to provide lamps that will function reliably from the compact and inexpensive piezoelectric sources that are practical for incorporation into modern miniature cameras. The mechanical energy delivered to the piezoelectric crystal, and thereby, the electrical output energy therefrom, is limited, both by the size of the device and by the necessity to minimize camera vibration and motion during use.

The high degree of electrical sensitivity needed in high-voltage flashlamps gives rise to distinct problems of inadvertent flashing during handling of the array package. Any static charges on equipment and personnel can cause the lamp to flash. This problem is discussed in U.S. Pat. Nos. 3,935,442 and 4,104,706, which describe a separate reflector member having a conductive coating which is "grounded" to the array circuit for providing an electrostatic shield, U.S. Pat. No. 3,941,992, which provides electrostatic protection by metalizing the back of the circuit board and providing a "ground" connection thereto, and U.S. Pat. Nos. 4,019,043 and 4,133,023, which provide ground connected spaced-apart foil shields on a separate indicia sheet located behind the circuit board.

In the linear photoflash unit of the present inventions, electrostatic protection is integrally provided by the rear housing member 26 in a cost-efficient manner by electrically connecting the conductive coating 42 to the common circuit conductor 24 by means such as a wire 84 soldered therebetween (FIGS. 2 and 3). In this manner, continuous conductive surfaces on rear wall 40 and sidewalls 36 and 38 of channel 30, and on the reflector cavities and front faces of outer flanges 32 and 34, provide a protective electrostatic shield about three sides of the sensitive circuit strip 18 and the lamps 11–16 mounted thereon. Hence, the member 26, with its conductive reflective coating 42, integrally provides the multiple functions of a rear housing enclosure, a printed circuit strip support, a multi-cavity reflector, and a very effective electrostatic shield. Further, the integral ledges 44 and 46, or the like, provide the desired spacing between the rear side of the circuit board and the shield surface rear wall 40 so as to reduce the capacitance between this portion of the shield and the non-common electrical portions of the circuit on the front side of the circuit strip.

Protection against electrostatic charges about the front face of the unit is provided in a manner following the teachings of U.S. Pat. No. 4,133,424. Cover panel 28 is provided with eight openings 86 distributed throughout the length thereof, as illustrated, and housing member 26 further includes eight metal-coated posts, or projections, 88 which respectively fit into the front face openings 86. Preferably, the conductive reflector projections protrude through the openings 86 in the cover panel beyond the exterior surface thereof, as shown in FIG. 3, so as to assure electrical contact with any charged object such as a user3 s band, which may touch the array housing.

As illustrated in FIGS. 1 and 2, projections 88 are symmetrically disposed on the front face of the housing flanges 32 and 34 between reflector cavity segments 11', 11" and 12', 12"; 12', 12" and 13', 13"; 14', 14" and 15', 15"; and 15', 15" 15" and 16', 16". These projections 88 were integral molded portions of the insulating plastic material of housing 26 which are covered with the continuous conductive reflective coating 42. Accordingly, the conductive projection 88 are connected to the common circuit conductor 24 via the surface coating 42 ad wire 84.

To enhance dissipation of electrostatic charges in proximity to the connector tabs 18a and 18b, a portion 42a (FIGS. 6 and 7) of the continuous coating of conductive reflective material 42 extends to the end of each of the integral extensions 47 and 47' of the housing member 26. Thus, each coating extension 42a is disposed between the rear wall of a respective housing extension 47 or 47a' and the side of the printed circuit strip opposite that on which the terminals 20, 22 or 20', 22' are located. In this manner, the overall shield 42 is rendered accessible for discharge thereto of electrostatic charges in proximity to the terminal ends of the printed circuit strip. This shield extension follows the general teachings of copending application Ser. No. 918,971 filed June 16, 1978, but provides the function in a more compact, costefficient manner.

In one specific embodiment of the illustrated six-lamp array, the unit has a nominal overall length of 5.572 inches, a nominal maximum width of 0.827 inch, and a nominal depth of 0.550 inch (excluding projections 88). Rear housing 26 is injection molded of an impact grade polystyrene, and cover panel 26 is molded of clear polystyrene with a color correcting blue tint. Printed circuit strip 18 is comprised of a flexible impact grade polystyrene substrate having a nominal width of 0.354 inch. The nominal outside diameter of each of the coated lamp envelopes is 0.325 inch, and the nominal width of channel 30 at the rear wall is 0.354 inch. For optimum compactness, the width of the printed circuit strip 18 should be in a range from less than the diameter of the tubular flashlamps to not more than 10% greater than the lamp diameter, and the width of the rear wall of channel 30 should be about equal to the width of the printed circuit strip. For molding purposes, the channel sidewalls 36 and 38 may be tapered to be wider at the front (not considering the reflector cavities). For example in this specific embodiment, the nominal width of channel 30 at the front is 0.394 inch. The sides of circuit strip 18 may have a corresponding taper. Thus, in some very compact units with comparatively large lamps, the lamp outside diameter can actually be wider than the circuit strip 18, the channel accomodating this inreased lamp size by virtue of the side wall taper and/or reflector cavities.

Although the invention has been described with respect to a specific embodiment, it will be appreciated that modifications and changes may be made by those skilled in the art without departing from the true spirit and scope of the invention. For example, in some embodiments, it may be desirable to provide shielding on the rear wall only and/or eliminate the projections 88. Further, the linear array construction is also adaptable for housing low-voltage flashlamps, in which case no shielding may be required. The array may be single ended, with a connector on only one end; the lamps may all be oriented in one direction; and the number of lamps may vary. For example, a higher output lamp array of the double-ended type may comprise two lamps of much larger volume positioned in each of the upper and lower groups and housed in a package of slightly larger dimensions.

We claim:

1. A multilamp photoflash unit comprising, in combination, a printed circuit board in the form of an elongated strip and having lamp-firing circuitry thereon, a plurality of electrically ignitable flashlamps disposed in a linear array along said printed circuit strip and having lead-in wires connected to said circuitry, an elongated housing member having a longitudinal channel within which said printed circuit strip is located, said housing member having reflective surfaces adjacent said flashlamps, and a light-transmitting cover panel attached to said housing member and enclosing said flashlamps therein.

2. The photoflash unit of claim 1 wherein said lamp-firing circuitry is on a surface of said printed circuit strip, and said flashlamps are positioned over said surface.

3. The photoflash unit of claim 2 wherein an end of said printed circuit strip contains terminals connected to said lamp firing circuitry, and said end of the printed circuit strip extends beyond said cover panel to expose said terminals thereon for connection to a camera.

4. The photoflash unit of claim 2 wherein said flashlamps have substantially tubular envelopes and are positioned with the longitudinal axes thereof substantially parallel to said surface of the printed circuit strip and arranged in substantially coaxial alignment.

5. The photoflash unit of claim 4 wherein each of said tubular flashlamps has substantially the same diameter, the width of said printed circuit strip is in a range from less than the diameter of said tubular flashlamps to not more than 10% greater than said lamp diameter, and the width of said channel in the housing member is about equal to the width of said printed circuit strip.

6. The photoflash unit of claim 1 wherein said housing member includes means within said channel for spacing said printed circuit strip from the rear wall of said channel.

7. The photoflash unit of claim 6 wherein said spacing means comprises a plurality of transverse ribs formed on the rear wall of said channel and spaced along the length thereof.

8. The photoflash unit of claim 6 wherein said spacing means comprises a set of longitudinally extending ledges formed along the corners of said channel adjacent to the rear wall thereof.

9. The photoflash unit of claim 1 wherein said printed circuit strip contains notches in opposite edges about the midportion thereof, and said housing member further includes guide ribs formed on opposite sidewalls of said channel normal to the rear wall thereof which engage said notches in the printed circuit strip for facilitating assembly and location of said strip within said channel so as to center said strip from end to end within said housing member and prevent longitudinal shifting of said strip.

10. The photoflash unit of claim 9 wherein said notches in opposite edges of said printed circuit strip are longitudinally offset from one another, and said guide ribs formed on opposite sidewalls of said channel are longitudinally offset from one another in a manner corresponding to said notches, thereby to prevent mounting of said printed circuit strip within said channel with the obverse side of the strip reversed to face the rear wall of the channel.

11. The photoflash unit of claim 9 wherein said sidewall guide ribs are tapered to facilitate fitting into the notches of said printed circuit strip during assembly and, thus, avoid an interference fit therebetween.

12. The photoflash unit of claim 3 wherein said housing member includes a set of longitudinally extending ledges formed along the corners of said channel adjacent to the rear wall thereof for spacing said printed circuit strip from said rear wall of the channel, said printed circuit strip contains notches in opposite edges about the midportion thereof, said notches being longitudinally offset from one another, and said housing member further includes tapered guide ribs formed on opposite sidewalls of said channel normal to the rear wall thereof and longitudinally offset from one another, said guide ribs engaging said notches in the printed circuit strip for facilitating assembly and location of said strip within said channel so as to prevent longitudinal shifting of said printed circuit strip and center said strip from end to end within said housing member with said surface of the strip containing lamp firing circuitry facing the outside of said channel.

13. The photoflash unit of claim 1 wherein said channel in the housing member has a cross-section which is substantially semi-rectangular.

14. The photoflash unit of claim 13 wherein said housing member further includes outer flanges adjoining the opposite sidewalls of said semi-rectangular channel, a plurality of symmetrical segments of parabolic reflector cavities are formed in said outer flanges, each pair of parabolic reflector cavity segments on opposite sides of said channel are associated with a respective one of said flashlamps, and said reflective surfaces of said housing member adjacent said flashlamps include said parabolic cavity segments.

15. The photoflash unit of claim 14 wherein said reflective surfaces of said housing member adjacent said flashlamps further include said opposite sidewalls of said semi-rectangular channel, said housing member thereby functioning as a multi-cavity reflector member and said printed circuit strip being located substantially internal to said reflector member.

16. The photoflash unit of claim 15 wherein said flashlamps have substantially tubular envelopes and are positioned in said channel with the longitudinal axes thereof substantially parallel to a surface of said printed circuit strip and arranged in substantially coaxial alignment, the common longitudinal axis of said flashlamps being substantially parallel to the longitudinal axes of said printed circuit strip and said channel and lying in a plane which symmetrically intersects the parabolic reflector cavity segments on opposite sides of said channel.

17. The photoflash unit of claim 1 wherein each of said flashlamps has a pair of lead-in wires connected to said circuitry, said circuitry includes a common circuit conductor connected electrically to one lead-in wire of each of said flashlamps, and at least portions of the rear wall of the channel of said housing member has an electrically conductive surface, and further including means electrically connecting the conductive surface of said rear wall to said common circuit conductor, whereby said rear wall conductive surface functions as shield to reduce the likelihood of said flashlamps being fired by electrostatic charges applied to said unit.

18. The photoflash unit of claim 17 wherein said housing member is formed of an insulating material and further includes a plurality of segments of reflector cavities formed on opposite sides of said channel, and surfaces of said channel and said reflector cavities are covered with a continuous coating of electrically conductive reflective material, said coating providing both said reflective surfaces adjacent the flashlamps and said conductive surface shield against electrostatic charges.

19. The photoflash unit of claim 18 wherein said housing member includes means within said channel for spacing said printed circuit strip from the rear wall of said channel.

20. The photoflash unit of claim 19 wherein said spacing means comprises a set of longitudinally extending ledges formed along the corners of said channel adjacent to the rear wall thereof.

21. The photoflash unit of claim 18 wherein said light-transmitting cover panel has a plurality of openings therein, and said housing member further includes a plurality of conductive projections which respectively fit into the openings of said cover panel and protrude therethrough beyond the exterior surface of said panel.

22. The photoflash unit of claim 18 wherein said channel in the housing member has a cross-section which is substantially rectangular, said housing member further includes outer flanges adjoining the opposite sidewalls of said semi-rectangular channel, said reflector cavities comprise a plurality of symmetrical segments of parabolic reflector cavities formed in said outer flanges, each pair of parabolic reflector cavity segments on opposite sides of said channel being associated with a respective one of said flashlamps, and said continuous coating of conductive reflective material covers said rear wall and said opposite sidewalls of said semi-rectangular channel and the surfaces of said outer flanges facing said cover panel including said parabolic reflector cavity segments, said housing member thereby functioning dually as a multi-cavity reflector member and an electrostatic shield, and said printed circuit strip being located substantially internal to said reflector member-shield.

23. The photoflash unit of claim 22 where said flashlamps have substantially tubular envelopes and are positioned in said channel with the longitudinal axes thereof substantially parallel to a surface of said printed circuit strip and arranged in substantially coaxial alignment, the common longitudinal axis of said flashlamps being substantially parallel to the longitudinal axes of said printed circuit strip and said channel and lying in a plane which symmetrically intersects the parabolic reflector cavity segments on opposite sides of said channel.

24. The photoflash unit of claim 23 wherein said light-transmitting cover panel has a plurality of openings therein, and said housing member further includes a plurality of projections from said flanges which are coated with said conductive reflective material and which respectively fit into the openings of said cover panel and protrude therethrough beyond the exterior surface of said panel, said projections being symmetrically disposed between selected ones of said reflector cavity segments.

25. The photoflash unit of claim 23 wherein said lamp-firing circuitry is on a surface of said printed circuit strip, an end of said printed circuit strip contains terminals connected to said lamp-firing circuitry, said end of the printed circuit strip extends beyond said cover panel to expose said terminals thereon for connection to a camera, said housing member further includes an integral extension which partly surrounds said extending end of the printed circuit strip exposing said terminals thereon, and said continuous coating of conductive reflective material on the rear wall of said channel extends to the end of said extension of the housing member, whereby said coating extension is disposed between said housing member extension and the side of said printed circuit strip opposite that on which said terminals are located such that said shield is accessible for discharge thereto of electrostatic charges in proximity to said terminal end of the printed circuit strip.

26. The photoflash unit of claim 25 wherein said housing member further includes means within said channel for spacing said printed circuit strip from the rear wall of said channel, said spacing means comprising a set of longitudinally extending ledges formed along the corners of said channel adjacent to the rear wall thereof, said coated surface of said housing member extension is offset from said rear wall of the channel so as to support said end of the printed circuit strip in the same plane that said strip is supported by said ledges.

27. The photoflash unit of claim 1 wherein said linear array of flashlamps is divided into first and second groups of two or more lamps each disposed on respectively opposite halves of said printed circuit strip, said prined circuit strip includes first and second connector means at respectively opposite ends thereof, said first connector means being located on the half of said circuit strip containing said first group of lamps and separated thereby from said second group of lamps, said second connector means being located on the half of said circuit strip containing said second group of lamps and separated thereby from said first group of lamps, a portion of said circuitry couples said first connector means to each lamp of said second group of lamps, and another portion of said circuitry couples said second connector means to each lamp of said first group of lamps, each of said coupling portions enabling flashing of a lamp in the group coupled thereto in response to flash activation signals applied to its associated connector means, thereby reducing the red-eye photographic effect.

28. The photoflash unit of claim 27 wherein said channel in the housing member has a cross-section which is substantially semi-rectangular, said housing member further includes outer flanges adjoining the opposite sidewalls of said semi-rectangular channel, a plurality of symmetrical segments of parabolic reflector cavities are formed in said outer flanges, each pair of parabolic reflector cavity segments on opposite sides of said channel are associated with a respective one of said flashlamps, whereby first and second groups of said reflector cavity segments on respectively opposite longitudinal halves of said housing member are associated with said first and second groups of flashlamps, respectively, and said reflective surfaces of said housing member adjacent said flashlamps include said parabolic cavity segments and said opposite sidewalls of said semi-rectangular channel, said housing member thereby functioning as a multi-cavity reflector member and said printed circuit strip being located substantially internal to said reflector member.

29. The photoflash unit of claim 28 wherein said flashlamps have substantially tubular envelopes and are positioned in said channel with the longitudinal axes thereof substantially parallel to a surface of said printed circuit strip and arranged in substantially coaxial alignment, the common longitudinal axis of said flashlamps being substantially parallel to the longitudinal axes of said printed circuit strip and said channel and lying in a plane which symmetrically intersects the parabolic reflector cavity segments on opposite sides of said channel.

30. The photoflash unit of claim 29 wherein said lamp-firing circuitry is on a surface of said printed circuit strip, said flashlamps are positioned over said surface, said first and second connector means comprise respective sets of terminals on opposite ends of said printed circuit strip, and said ends of the printed circuit strip extend beyond opposite ends of said cover panel to expose said terminals thereon for connection to a camera.

31. The photoflash unit of claim 30 wherein each of said flashlamps has a pair of lead-in wires connected to said circuitry, said circuitry includes a common circuit conductor connected electrically to one lead-in wire of each of said flashlamps, and surfaces of the rear wall and side walls of said channel and said reflector cavities are covered with a continuous coating of electrically conductive reflective material, and further including means electrically connecting the conductive coating on surfaces of said channel to said common circuit conductor, whereby said coating provides to reduce the likelihood of said flashlamps being fired by electrostatic charges applied to said unit.

32. The photoflash unit of claim 27 wherein said first and second connection means comprise respective sets of terminals on opposite ends of said printed circuit strip, said ends of the printed circuit strip extend beyond opposite ends of said cover panel to expose said terminals thereon for connection to a camera, said printed circuit strip contains notches in opposite edges about the midportion thereof, and said housing member further includes guide ribs formed on opposite sidewalls of said channel normal to the rear wall thereof which engage said notches in the printed circuit strip for facilitating assembly and location of said strip within said channel so as to center said strip from end to end within said housing member and prevent longitudinal shifting of said strip.

33. The photoflash unit of claim 32 wherein said notches in opposite edges of said printed circuit strip are longitudinally offset from one another, and said guide ribs formed on opposite sidewalls of said channel are longitudinally offset from one another in a manner corresponding to said notches, thereby to prevent mounting of said printed circuit strip within said channel with the obverse side of the strip reversed to face the rear wall of the channel.

34. The photoflash unit of claim 33 wherein said sidewall guide ribs are tapered to facilitate fitting into the notches of said printed circuit strip during assembly and, thus, avoid an interference fit therebetween.

* * * * *